Jan. 3, 1967  K. HINSCH ETAL  3,295,488
HYDRAULIC RUDDER CONTROL SYSTEM
Filed June 22, 1964  2 Sheets-Sheet 1

Inventors:
Karl Hinsch
Heinz Augustin
Jörg Heinemann

By: Spencer & Kaye
ATTORNEYS

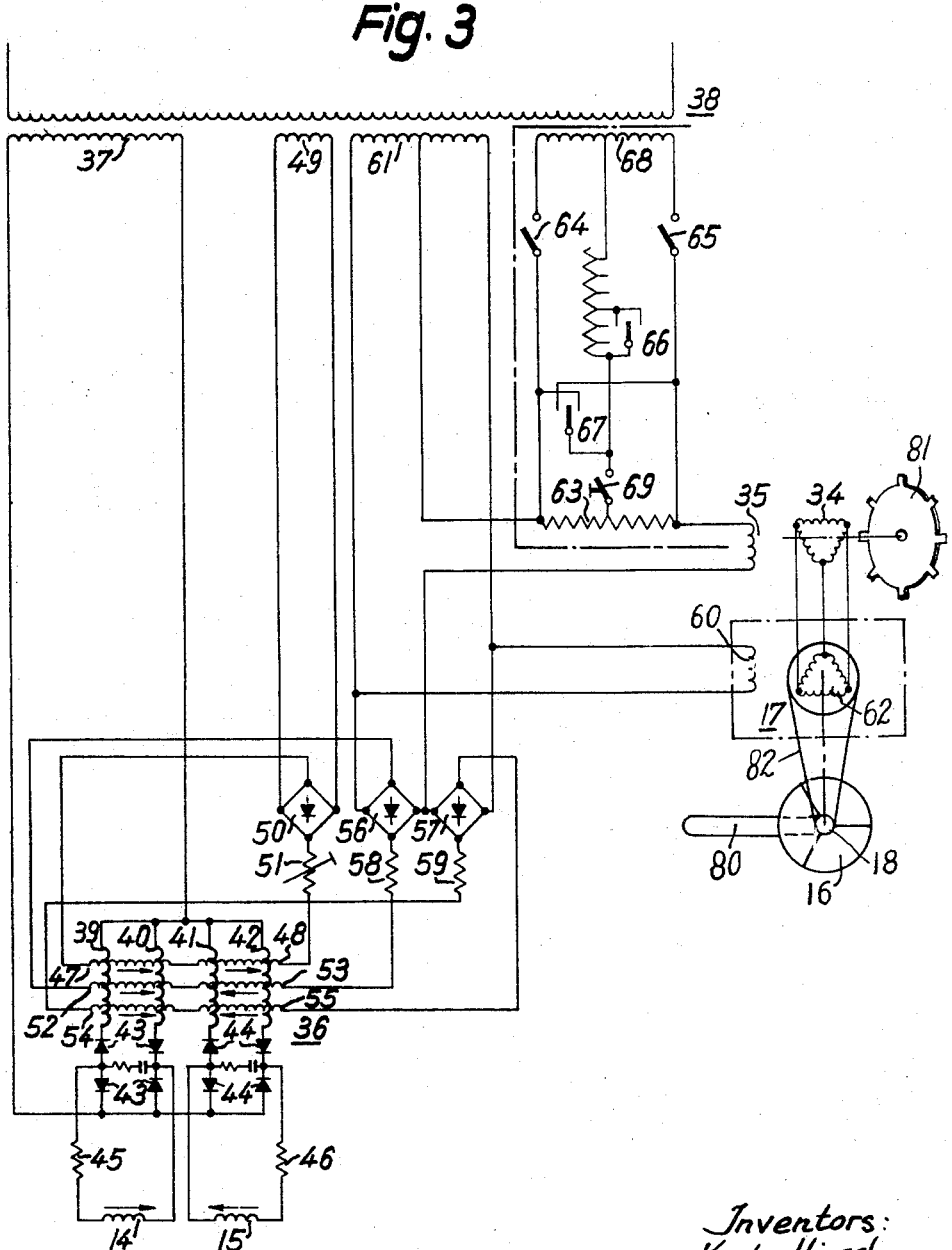

United States Patent Office 3,295,488
Patented Jan. 3, 1967

3,295,488
HYDRAULIC RUDDER CONTROL SYSTEM
Karl Hinsch, Hamburg, Heinz Augustin, Hamburg-Harburg, and Jörg Heinemann, Bad Oldesloe, Germany, assignors to Licentia Patent-Verwaltungs-G.m.b.H., Frankfurt am Main, Germany
Filed June 22, 1964, Ser. No. 377,015
Claims priority, application Germany, June 21, 1963,
L 45,168
6 Claims. (Cl. 114—150)

The present invention relates to a hydraulic rudder control system in which a hydraulic device which sets the position of the rudder is actuated by means of fluid pressure produced by a pump.

There exist many types of electric control circuits for use with a hydraulic rudder control system. These control circuits are, as a general rule, quite complicated and expensive, their basic object being to obtain as great an accuracy as possible, i.e., to enable the ship's rudder to be positioned with the greatest degree of accuracy that is possible in order to cause the ship to execute a desired turn. To accomplish any particular maneuver, the rudder will have to be swung to a certain position, hereinafter referred to as the nominal position. In order to prevent the rudder from being moved beyond the nominal position, i.e., in order to prevent over-controlling, the rudder is generally moved from whatever position it is in to the nominal position by a series of small movements, i.e., the rudder is pulsed into its nominal position. This requires a relatively large number of switching operations which, in turn, subject the moving parts to substantial wear. This drawback has simply been considered to be unavoidable if maximum accuracy is to be attained.

Other types of rudder control systems use constant pressure pumps. It was heretofore thought, however, that the use of such pumps aggravated the tendency of the system to overcontrol the rudder as the same is moved, under the application of a constant pressure, into its nominal position, particularly if no special measures were taken in order to prevent this. These special measures were, for example, constituted by certain types of feedback so that, in the interests of obtaining a highly accurate rudder control system, existing systems take this inherent drawback into consideration.

Also known is the application of a vibratory frequency, higher than the line frequency of the electrical system, to a control device, the purpose of this being to overcome static friction. In the case of rudder control systems, however, the use of such vibratory frequencies are not customary and, in fact, avoided inasmuch as it was feared that the vibration would adversely affect the fluid conduits, the seals, and the like.

It is, therefore, the primary object of the present invention to provide an accurate rudder control system which overcomes the above drawbacks, and, with this object in view, the present invention resides in a rudder control system which itself contains a combination of features, each known per se, but which, in combination, coact to overcome the drawbacks which each of the features individually produced. That is to say, the drawbacks which are found to be produced if the components are provided alone, cancel each other, to a very large extent, if the rudder control system incorporates the following:

(1) A pump which is regulated to put out a constant pressure.

(2) A positioning or control member, such as an electro-hydraulic valve, which operates so as continually to regulate the position of the rudder.

(3) Electrical means for operating the valve and for continually applying a vibratory frequency thereto; more particularly, a quiescent-current, movement-dependent remote control system for the electro-hydraulic valve, this system having a vibratory or jarring frequency which also serves to actuate the valve.

In the case of smaller rudder installations, for example on coasters, speed boats, or the like, the hydraulically actuated rudder actuator, such as a rotary vane drive, is mounted directly on the rudder shaft. In the case of larger installations, a main slide can be actuated which coacts with a control piston which itself is able to control rudder installations involving relatively large moments.

According to another feature of the present invention, the hydraulic circulation is "open," in the sense that the entire circuit is not under pressure. This avoids a number of drawbacks associated with "closed" systems, such as the need to provide a special cooler for the pressure medium—an expensive piece of equipment—as well as the need to provide special means for preventing the formation of bubbles.

At least in the case of medium and smaller size installations, the arrangement according to the present invention, operating without any hydraulic or mechanical feedback, involves substantially less expensive means than are required in the case of heretofore known installations. The accuracy which can be obtained is a setting within less than 0.5° rudder, and is therefore at worst equal to the accuracy heretofore obtainable.

The electro-hydraulic control valve, which may be fashioned as a moving coil or plunger-type device, is controlled by means of an electric circuit which includes a voltage-controlling magnetic amplifier which puts out D.C. output voltages. The amplifier is responsive to the instantaneous deviation of the rudder position from a given nominal or command position, and may be fashioned as a push-pull amplifier. The amplifier controls each of two windings of the valve so as to be able to move the valve in both directions. The means for producing the actual control signal representing the deviation include a nominal value generator, such as the wheel by means of which the ship is steered, and an actual value generator, which may be constituted by a rudder monitor which is responsive to the movement of the rudder shaft.

The present invention is of particular advantage when used in conjunction with a movement-dependent remote control system, and when the output winding of the nominal or actual value generator of the movement-dependent remote control system is connected in series with a predetermined steering control, preferably one having both coarse and fine adjustments, and with a continuity-type contact for effecting rudder return for changing the rudder null-point. Heretofore, conventional rudder control systems in which a constant rudder angle to port or starboard is set, can have the rudder mid-point changed—as is required, for example, when the ship is loaded unevenly—only by means of separate setting devices for the port and starboard rudder angles. According to the present invention, however, a constant counter rudder angle can be set, in a simple manner, by means of the wheel or by automatic means.

Additional objects and advantages of the present invention will become apparent upon csonsideration of the following description when taken in conjunction with the accompanying drawings in which:

FIGURE 3 is a circuit diagram of a movement-dependent, quiescent-current remote control system.

Figure 1:
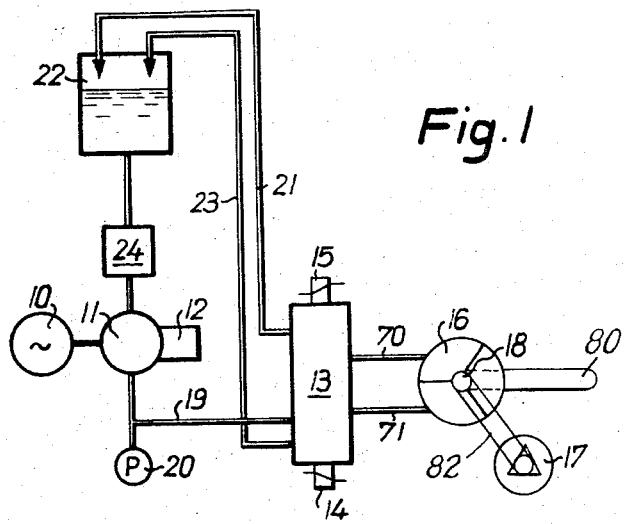
FIGURE 1 is a schematic diagram showing the hydraulic circuit of a rudder control system according to the present invention.

Referring now to the drawings and to FIGURE 1 thereof in particular, the same shows the hydraulic components of a rudder control system according to the present invention.

The hydraulic circulation is pressurized by means of a pump 11 which is driven by an electric motor 10. The pump 11 is regulated by means of a regulator 12 so that the pump delivers a constant pressure. The pump itself can be of any suitable construction, eg., since the pump is called upon to move the pressure medium—usually oil—in but one direction, it can be constituted by an oscillating piston pump with a regulated stroke. The output pressure can be read by means of a gauge 20. The discharge or pressure side of the pump is applied, via conduit 19, to an electro-hydraulic plunger-type control valve 13, the latter being provided with two electromagnetic windings 14 and 15 so as to enable the valve to be moved in both directions. The valve 13 is connected, via two conduits 70 and 71, to a rotary vane drive 16 and regulates not only the quantity of oil but also the direction in which a rotary vane drive is turned. The rotary vane drive is mechanically coupled to the rudder shaft 18. A monitor 17, whose function is to produce a signal representing the actual, instantaneous position of the rudder 80, is connected directly to the rudder shaft 18 so as to be directly responsive to the movement thereof.

The control valve 13 is connected to an exhaust discharge conduit 21 through which the spent oil, i.e., the oil which is no longer under pressure, is fed back to a collector tank 22. A further return conduit 23 is provided for putting any leakage oil back into the tank 22. The intake of pump 11 is connected, via a filter 24, to the tank 22.

Figure 2:
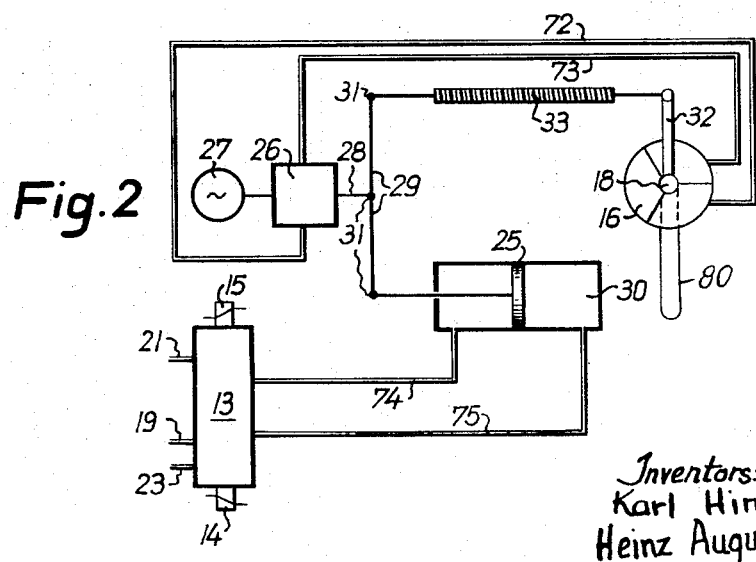
FIGURE 2 is a schematic diagram showing the hydraulic circuit of a modified rudder control system according to the instant invention.

In the embodiment of FIGURE 2, the valve 13 is not connected directly to the rotary vane drive but, via conduits 74 and 75, to a cylinder 30 within which is arranged a positioning or control piston 25, the latter serving to vary the stroke of an adjustable stroke pump 26. This pump is driven by an electric motor 27 and is connected, via conduits 72 and 73, to the rotary vane drive 16. The pump 26 is provided with a stroke adjusting lever 28 which controls the delivery rate and pumping direction and coacts with the linkage 29 such that, upon actuation of the piston 25, the lever 28 is first moved relative to the pump 26 inasmuch as the counter-moment offered by the rotary vane drive will hold the linkage 29 stationary at point 31. Since the stroke of the pump 26 has now been varied, this will, in turn, cause the rotary vane drive to turn, thereby to change the angular position of the rudder shaft 18. The latter carries an arm 32 which is connected to the end point 31 of the linkage 29, via an adjustable connecting spindle 33, so that as soon as the rudder reaches its nominal position, the pump 26 is made to stop its delivery of pressure fluid. Thus, the positioning piston 25 has the function of presetting the nominal value into the actual moving means which effect the positioning of the rudder 80.

FIGURE 3 is a circuit diagram of a movement-dependent, quiescent-current remote control system which operates windings 14 and 15. The rudder 80 is steered by means of a wheel 81 having a primary winding 34 and a secondary winding 35 forming part of the control circuit for the valve 13.

The windings 14 and 15 of this valve 13 are fed by the output of a magnetic amplifier 36. The latter is supplied by a secondary winding 37 of a line transformer 38. Each of the windings 14 and 15 is connected to the output of the two working windings 39, 40, and 41, 42, of the magnetic amplifier 36 via the rectifiers 43 and 44 and resistors 45 and 46. The outputs of the coacting windings 39, 40, and 41, 42, are so connected to the rectifiers 43, 44, respectively, that the harmonics produced in the magnetic amplifier may reach the windings 14 and 15, it being in this way that the vibrating or jarring frequency is applied. In the instant embodiment, the vibrating frequency has twice the frequency of the line voltage which feeds the amplifier. The magnetic amplifier 36 operates in such a manner that a working current flows through it even when there is no electrical signal as the result of which a movement-producing current is made to flow through the windings 14 and 15, so that the vibrating frequency will be applied to the windings 14 and 15 in both operating and so-called quiescent condition of the circuit when the valve 13 is not called upon to carry out any movement.

The magnetic amplifier 36 is pre-excited by means of control windings 47 and 48, these windings being fed from a further secondary winding 49 of the line transformer 38 via a rectifier 50 and a setting resistor 51.

The magnetic amplifier 36 is controlled by means of the control windings 52, 53, 54, 55, the control circuit consisting of the windings 52 and 53 and the control circuit consisting of the windings 54 and 55 being subjected to the action of a phase comparison circuit which itself consists, essentially, of the rectifiers 56 and 57 and the input resistors 58 and 59, the input of this comparison circuit being connected to the output winding 35 of the wheel (the nominal value generator) and the output winding 60 of the rudder position monitor 17 (the actual value generator) whose primary winding is shown at 62, it being this primary winding which puts out a signal that represents the actual position of the rudder 80 and which is connected thereto via a suitable linkage 82. The phase comparison circuit is powered by means of a third secondary winding 61 of the line transformer 38.

The output winding 35 of the wheel is connected in series with a resistor 63 which is part of a predetermined steering control. This control makes available a constant rudder angle for each direction. This rudder angle may, depending on the amplitude of the rudder deviation, contain, via switches 64 and 65, a deflection of, for example, 2° rudder, while in the case of larger rudder deflections, a further switch 66 is closed which increases the particular rudder angle by, for example, a further 3°. A continuity-type switch 67 is provided for bringing the rudder into the new null-position in time, at the start of the movement to bring the ship over; this type of arrangement is shown, for example, in German Patent No. 951,423, published in 1956.

The automatic control system is energized by yet another secondary winding 68 of the line transformer 38, and can be deactivated by opening a switch 69, in which case the rudder can be steered by hand.

It will be understood that the above description of the present invention is susceptible to various modifications, changes, and adaptations, and the same are intended to be comprehended within the meaning and range of equivalents of the appended claims.

What is claimed is:

1. A hydraulic rudder control system which comprises:
   (a) a rudder actuator;
   (b) a pump regulated to put out a constant pressure and being connected hydraulically directly to said rudder actuator, said pump including means for adjusting the constant pressure which is put out by said pump;
   (c) hydraulic-mechanical means mechanically connected to said rudder actuator and to said pressure adjusting means of said pump;
   (d) a continually operating electro-hydraulic control valve hydraulically connected to said hydraulic-mechanical means for controlling the setting of said pressure adjusting means of said pump and hence for controlling the flow of pressure fluid medium from said pump to said rudder actuator; and
   (e) a movement-dependent quiescent-current remote control arrangement electrically connected to said control valve, said arrangement including means for applying a vibratory frequency to said control valve, said vibratory frequency also serving to actuate said valve.

2. A rudder control system as defined in claim 1 wherein said hydraulic-mechanical means include a cylinder hydraulically connected to said valve, a piston arranged in said cylinder and movable therein in response to control by said valve, and a linkage connecting said piston with said pressure adjusting means of said pump and said rudder actuator causing the output of said pump to be adjusted to a constant pressure that results in movement of said rudder actuator into the desired position.

3. A rudder control system as defined in claim 2 wherein said linkage includes an arm and means for connecting one end of said arm to said piston, the other end of said arm to said rudder actuator, and an intermediate point of said arm to said pressure adjusting means.

4. A rudder control system as defined in claim 3 and further including a second constant pressure pump, said second pump being connected to said valve for delivering pressure fluid medium to said cylinder.

5. A rudder control system as defined in claim 4 wherein said control arrangement comprises a magnetic amplifier electrically connected to said valve, said magnetic amplifier having control windings, a steering wheel having primary and secondary windings, a rudder position monitor having primary and secondary windings, and means interconnecting said control windings of said magnetic amplifier and said secondary windings of said steering wheel and of said rudder position monitor.

6. A rudder control system as defined in claim 5 wherein said control arrangement further comprises means connected in circuit with said control windings of said magnetic amplifier and said secondary windings of said steering wheel and of said rudder position monitor for making available a constant rudder angle for each direction.

References Cited by the Examiner
UNITED STATES PATENTS

| | | | |
|---|---|---|---|
| 2,389,274 | 11/1945 | Pearsall et al. | 244—85 X |
| 2,451,263 | 10/1948 | Webb | 244—83 |
| 2,655,132 | 10/1953 | Scheib | 91—429 X |
| 2,681,116 | 6/1954 | Treseder | 91—429 X |
| 3,045,956 | 7/1962 | Gaynor et al. | 244—78 |
| 3,094,132 | 6/1963 | Byloff | 91—429 X |
| 3,128,420 | 4/1964 | Rose | 318—20.250 |
| 3,133,520 | 5/1964 | Bentkowski et al. | 114—144 |

FERGUS S. MIDDLETON, *Primary Examiner.*

ANDREW H. FARRELL, MILTON BUCHLER,
*Examiners.*